United States Patent
Taherzadeh Boroujeni et al.

(10) Patent No.: US 11,672,006 B2
(45) Date of Patent: Jun. 6, 2023

(54) MESSAGE 3 REPETITION WITH RECEIVE BEAM SWEEP AND ASSOCIATED BEAM REFINEMENT FOR MESSAGE 4

(71) Applicant: QUALCOMM Incorporated, San Diego, CA (US)

(72) Inventors: Mahmoud Taherzadeh Boroujeni, San Diego, CA (US); Tao Luo, San Diego, CA (US); Juan Montojo, San Diego, CA (US); Peter Gaal, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 157 days.

(21) Appl. No.: 17/178,915

(22) Filed: Feb. 18, 2021

(65) Prior Publication Data
US 2021/0266955 A1 Aug. 26, 2021

Related U.S. Application Data

(60) Provisional application No. 62/980,004, filed on Feb. 21, 2020.

(51) Int. Cl.
*H04W 74/00* (2009.01)
*H04W 74/08* (2009.01)
(Continued)

(52) U.S. Cl.
CPC ......... *H04W 74/006* (2013.01); *H04L 5/0012* (2013.01); *H04W 16/28* (2013.01); *H04W 72/046* (2013.01); *H04W 74/0833* (2013.01)

(58) Field of Classification Search
None
See application file for complete search history.

(56) References Cited

U.S. PATENT DOCUMENTS 10,897,780 B2 * 1/2021 Islam ............... H04W 74/0833
11,064,518 B2 * 7/2021 Chendamarai Kannan ..............
H04B 7/0408
(Continued)

FOREIGN PATENT DOCUMENTS

CN 108234005 A * 6/2018 ........... H04B 7/0617
CN 108234005 A 6/2018
(Continued)

OTHER PUBLICATIONS

International Search Report and Written Opinion—PCT/US2021/018813—ISA/EPO—dated May 28, 2021.

*Primary Examiner* — Faiyazkhan Ghafoerkhan
(74) *Attorney, Agent, or Firm* — Arent Fox, LLP

(57) ABSTRACT

A random access procedure between a user equipment (UE) and a base station may include repetition of a random access message 3 to improve reception and provide for selection of a refined beam. The UE may receive, using a first receive beam, a random access message 2 transmitted by a base station using a first transmit beam. The random access message 2 indicates to the UE to transmit a plurality of repetitions of a random access message 3. The UE may transmit the plurality of repetitions based on the random access message 2. The UE may receive a random access message 4 transmitted by the base station using a second transmit beam that is a sub-beam of the first transmit beam based on transmitting the plurality of repetitions. The base station may select the second transmit beam based on at least one of the plurality of repetitions.

27 Claims, 9 Drawing Sheets

(51) Int. Cl.
*H04W 72/044* (2023.01)
*H04L 5/00* (2006.01)
*H04W 16/28* (2009.01)

(56) References Cited

U.S. PATENT DOCUMENTS

| | | | | |
|---|---|---|---|---|
| 11,246,156 | B2* | 2/2022 | Awad | H04W 74/004 |
| 2016/0065284 | A1* | 3/2016 | Yu | H04W 72/23 370/329 |
| 2016/0100431 | A1* | 4/2016 | Kishiyama | H04W 74/08 370/252 |
| 2016/0242212 | A1* | 8/2016 | Wong | H04W 74/0833 |
| 2017/0181009 | A1* | 6/2017 | Wong | H04L 1/08 |
| 2017/0273113 | A1* | 9/2017 | Tirronen | H04W 4/70 |
| 2017/0279646 | A1* | 9/2017 | Yi | H04L 5/0053 |
| 2017/0311355 | A1* | 10/2017 | Yi | H04J 11/0026 |
| 2018/0006779 | A1* | 1/2018 | Yi | H04L 5/0053 |
| 2018/0035471 | A1* | 2/2018 | Tabet | H04W 74/0833 |
| 2018/0069593 | A1* | 3/2018 | Yi | H04L 5/003 |
| 2018/0176958 | A1* | 6/2018 | Islam | H04W 72/046 |
| 2018/0227772 | A1* | 8/2018 | Yu | H04W 72/04 |
| 2018/0227786 | A1* | 8/2018 | Yu | H04B 7/0619 |
| 2018/0317214 | A1* | 11/2018 | Ding | H04W 72/046 |
| 2018/0324850 | A1* | 11/2018 | Amuru | H04W 74/006 |
| 2018/0359712 | A1* | 12/2018 | Hui | H04W 52/50 |
| 2019/0037423 | A1* | 1/2019 | Yu | H04B 7/0695 |
| 2019/0045554 | A1* | 2/2019 | Ye | H04W 74/0833 |
| 2019/0081689 | A1* | 3/2019 | Yu | H04W 24/04 |
| 2019/0124715 | A1* | 4/2019 | Chen | H04W 74/0866 |
| 2019/0268961 | A1* | 8/2019 | Tsai | H04W 16/28 |
| 2019/0341962 | A1* | 11/2019 | Yi | H04W 4/70 |
| 2019/0342921 | A1* | 11/2019 | Loehr | H04L 5/0053 |
| 2019/0349144 | A1* | 11/2019 | Yang | H04L 1/1819 |
| 2019/0357159 | A1* | 11/2019 | Pan | H04L 5/0007 |
| 2019/0387550 | A1* | 12/2019 | Pan | H04W 74/0833 |
| 2020/0037360 | A1* | 1/2020 | Qian | H04B 7/0695 |
| 2020/0053607 | A1* | 2/2020 | Ingale | H04L 5/0053 |
| 2020/0120709 | A1* | 4/2020 | Bergquist | H04W 74/0833 |
| 2020/0136708 | A1* | 4/2020 | Pan | H04B 7/0408 |
| 2020/0153560 | A1* | 5/2020 | Park | H04L 1/1887 |
| 2020/0187246 | A1* | 6/2020 | Amuru | H04J 11/0073 |
| 2020/0213981 | A1* | 7/2020 | Park | H04W 72/23 |
| 2020/0288509 | A1* | 9/2020 | Park | H04W 52/0216 |
| 2020/0351919 | A1* | 11/2020 | Oh | H04W 74/0808 |
| 2020/0367290 | A1* | 11/2020 | Mazloum | H04W 74/0833 |
| 2020/0413454 | A1* | 12/2020 | Ye | H04L 5/0007 |
| 2021/0037553 | A1* | 2/2021 | Wong | H04W 72/1268 |
| 2021/0045160 | A1* | 2/2021 | Irukulapati | H04W 74/006 |
| 2021/0076384 | A1* | 3/2021 | MolavianJazi | H04L 5/0092 |
| 2021/0105820 | A1* | 4/2021 | Kim | H04B 7/022 |
| 2021/0112590 | A1* | 4/2021 | Kim | H04W 72/0453 |
| 2021/0266955 | A1* | 8/2021 | Taherzadeh Boroujeni | H04B 7/0695 |

FOREIGN PATENT DOCUMENTS

| | | |
|---|---|---|
| WO | 2018229555 A2 | 12/2018 |
| WO | WO-2018229555 A2 * | 12/2018 ............ H04L 29/06 |

* cited by examiner

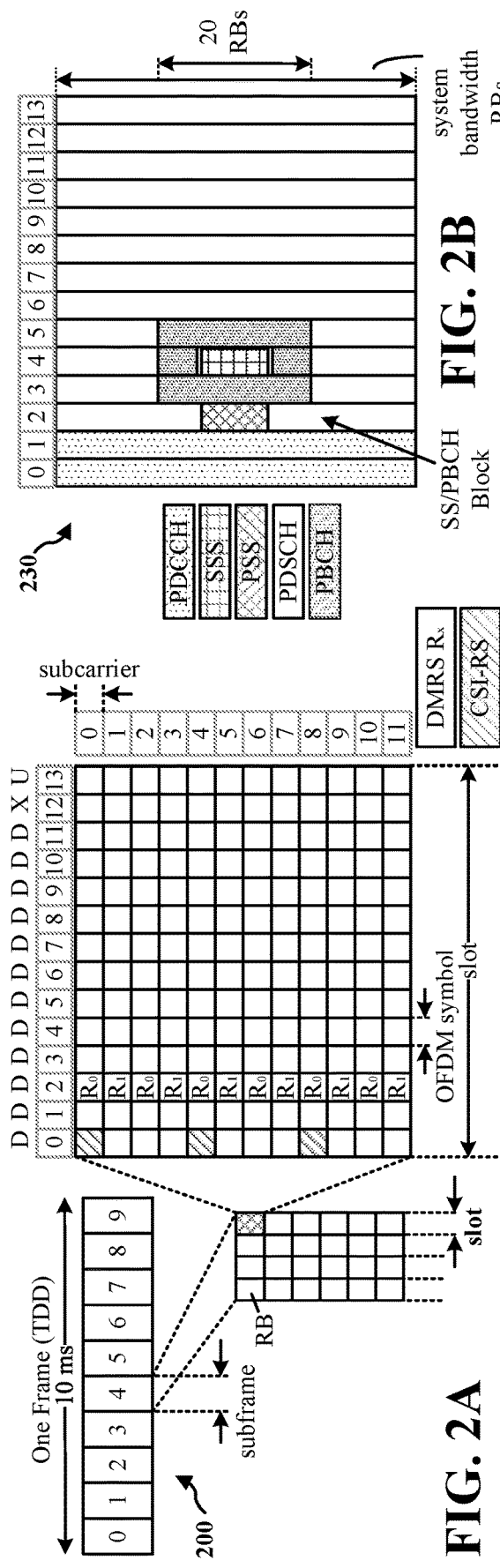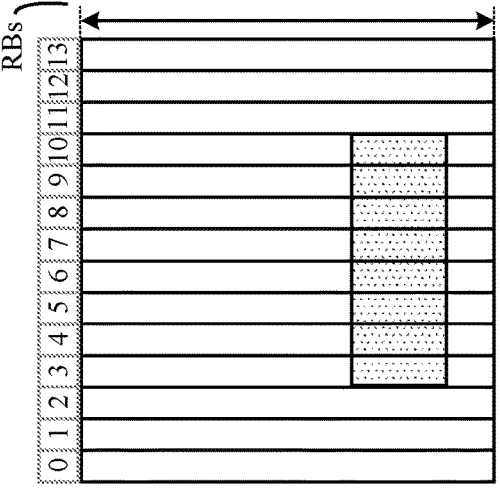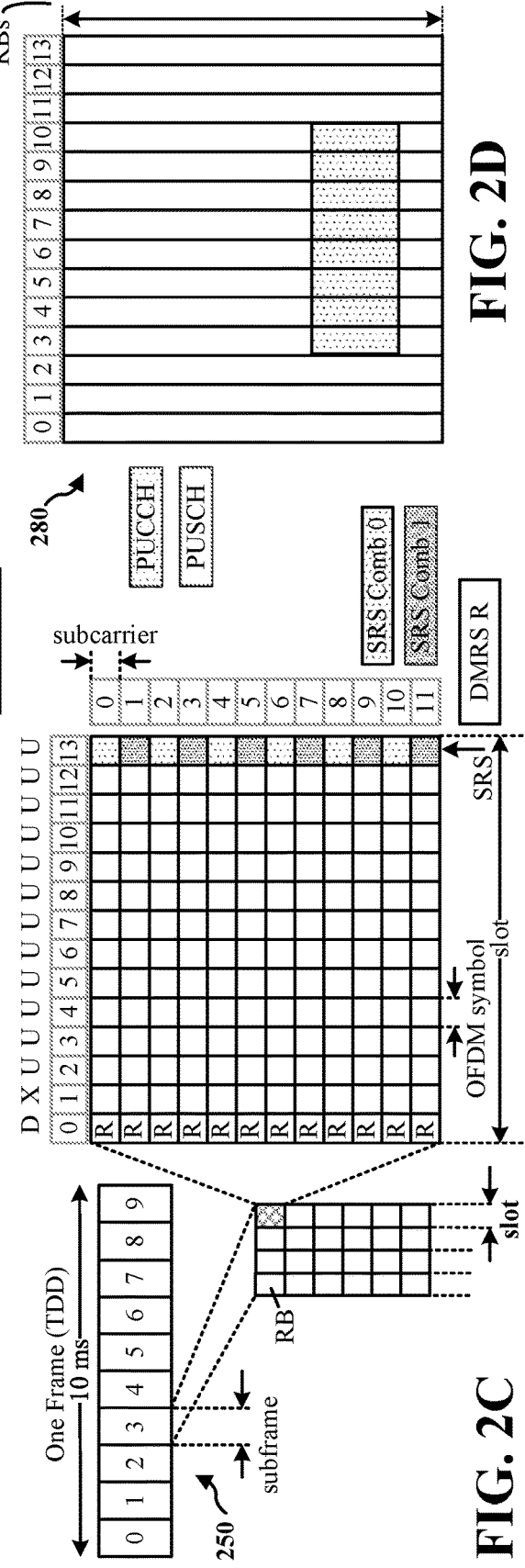

MESSAGE 3 REPETITION WITH RECEIVE BEAM SWEEP AND ASSOCIATED BEAM REFINEMENT FOR MESSAGE 4

CROSS REFERENCE TO RELATED APPLICATIONS

This application claims priority to U.S. Provisional Application No. 62/980,004 titled "MESSAGE 3 REPETITION WITH RECEIVE BEAM SWEEP AND ASSOCIATED BEAM REFINEMENT FOR MESSAGE 4," filed Feb. 21, 2020, which is assigned to the assignee hereof, and incorporated herein by reference in its entirety.

BACKGROUND

Technical Field

The present disclosure relates generally to wireless communication systems, and more particularly, to a random access procedure for establishing wireless communications.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology.

In particular, wireless communication may include a random access procedure that allows a user equipment (UE) to initiate or resume communications with a base station. Under certain channel conditions, various messages of the random access procedure may not be received correctly, which may delay or prevent the UE from connecting to the base station. Improvements are presented herein. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus for wireless communications of a user equipment (UE) are provided. The method may include receiving, using a first receive beam, a random access message 2 transmitted by a base station using a first transmit beam, the random access message 2 indicating to the UE to transmit a plurality of repetitions of a random access message 3, the random access message 2 further including an indication of a number of repetitions in the plurality of repetitions. The method may include transmitting the plurality of repetitions of the random access message 3 based on the random access message 2. The method may include receiving a random access message 4 transmitted by the base station using a second transmit beam that is a sub-beam of the first transmit beam based on transmitting the plurality of repetitions of the random access message 3.

In an aspect, the disclosure provides an apparatus for wireless communications. The apparatus may include a memory storing computer executable instructions and at least one processor coupled to the memory and configured to execute the instructions. The at least one processor may be configured to receive, using a first receive beam, a random access message 2 transmitted by a base station using a first transmit beam, the random access message 2 indicating to the UE to transmit a plurality of repetitions of a random access message 3, the random access message 2 further including an indication of a number of repetitions in the plurality of repetition. The at least one processor may be configured to the plurality of repetitions of the random access message 3 based on the random access message 2. The at least one processor may be configured to receive a random access message 4 transmitted by the base station using a second transmit beam that is a sub-beam of the first transmit beam based on transmitting the plurality of repetitions of the random access message 3.

In an aspect, the disclosure provides another apparatus for wireless communication. The apparatus may include means for receiving, using a first receive beam, a random access message 2 transmitted by a base station using a first transmit beam, the random access message 2 indicating to the UE to transmit a plurality of repetitions of a random access message 3, the random access message 2 further including an indication of a number of repetitions in the plurality of repetitions. The apparatus may include means for the plurality of repetitions of the random access message 3 based on the random access message 2. The apparatus may include means for receiving a random access message 4 transmitted by the base station using a second transmit beam that is a sub-beam of the first transmit beam based on transmitting the plurality of repetitions of the random access message 3.

In an aspect, the disclosure provides a non-transitory computer-readable medium storing computer executable code. The code when executed by a processor cause the processor to receive, using a first receive beam, a random access message 2 transmitted by a base station using a first transmit beam, the random access message 2 indicating to the UE to transmit a plurality of repetitions of a random access message 3, the random access message 2 further including an indication of a number of repetitions in the plurality of repetitions. The code when executed by a processor cause the processor to transmit the plurality of repetitions of the random access message 3 based on the random access message 2. The code when executed by a processor cause the processor to receive a random access message 4 transmitted by the base station using a second transmit beam that is a sub-beam of the first transmit beam based on transmitting the plurality of repetitions of the random access message 3.

In an aspect of the disclosure, a method, a computer-readable medium, and an apparatus for wireless communications of a base station are provided. The method may include transmitting, to a UE using a first transmit beam, a random access message 2 indicating to the UE to transmit a plurality of repetitions of a random access message 3, the random access message 2 further including an indication of a number of repetitions in the plurality of repetitions. The method may include receiving a number of repetitions of the random access message 3 based on the random access message 2 using a different refined beam for each repetition. The method may include transmitting a random access message 4 via a second transmit beam that is a sub-beam of the first transmit beam based on at least one of the plurality of repetitions of the random access message 3.

In an aspect, the disclosure provides an apparatus for wireless communications. The apparatus may include a memory storing computer executable instructions and at least one processor coupled to the memory and configured to execute the instructions. The at least one processor may be configured to transmit, to a UE using a first transmit beam, a random access message 2 indicating to the UE to transmit a plurality of repetitions of a random access message 3, the random access message 2 further including an indication of a number of repetitions in the plurality of repetitions. The at least one processor may be configured to receive a number of repetitions of the random access message 3 based on the random access message 2 using a different refined beam for each repetition. The at least one processor may be configured to transmit a random access message 4 via a second transmit beam that is a sub-beam of the first transmit beam based on at least one of the plurality of repetitions of the random access message 3.

In an aspect, the disclosure provides another apparatus for wireless communication. The apparatus may include means for transmitting, to a UE using a first transmit beam, a random access message 2 indicating to the UE to transmit a plurality of repetitions of a random access message 3, the random access message 2 further including an indication of a number of repetitions in the plurality of repetitions. The apparatus may include means for receiving a number of repetitions of the random access message 3 based on the random access message 2 using a different refined beam for each repetition. The apparatus may include means for transmitting a random access message 4 via a second transmit beam that is a sub-beam of the first transmit beam based on at least one of the plurality of repetitions of the random access message 3.

In an aspect, the disclosure provides a non-transitory computer-readable medium storing computer executable code The code when executed by a processor cause the processor to transmit, to a UE using a first transmit beam, a random access message 2 indicating to the UE to transmit a plurality of repetitions of a random access message 3, the random access message 2 further including an indication of a number of repetitions in the plurality of repetitions. The code when executed by a processor cause the processor to receive a number of repetitions of the random access message 3 based on the random access message 2 using a different refined beam for each repetition. The code when executed by a processor cause the processor to transmit a random access message 4 via a second transmit beam that is a sub-beam of the first transmit beam based on at least one of the plurality of repetitions of the random access message 3.

To the accomplishment of the foregoing and related ends, the one or more aspects comprise the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G new radio (NR) frame.

FIG. 2B is a diagram illustrating an example of downlink (DL) channels within a 5G NR subframe.

FIG. 2C is a diagram illustrating an example of a second 5G NR frame.

FIG. 2D is a diagram illustrating an example of uplink (UL) channels within a 5G NR subframe.

DETAILED DESCRIPTION

Figure 1:
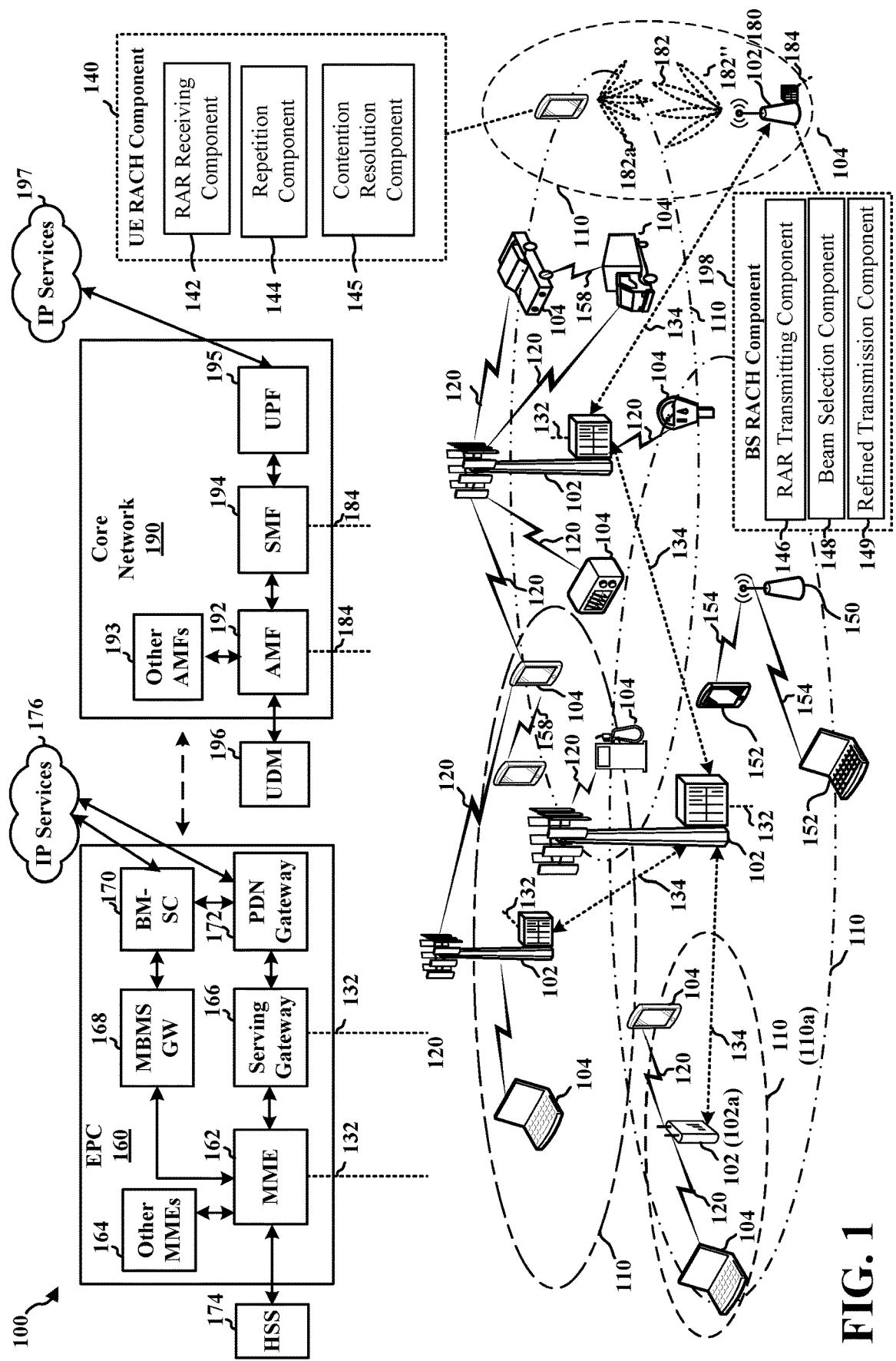
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those of ordinary skill in the art that these concepts may be practiced without these specific details. In some instances, structures and components are shown in block diagram form in order to avoid obscuring such concepts.

In a random access channel (RACH) procedure, under some channel conditions, transmitted messages may not be received correctly. In particular, when high carrier frequencies are utilized, transmissions may be subject to high path loss. Beamforming between a user equipment (UE) and a base station may overcome the path loss experienced at high carrier frequencies. During a RACH procedure, however, beamforming between the UE and the base station may not be established, for example, because the UE has been inactive prior to the RACH procedure.

The present disclosure addresses this problem with RACH procedures by utilizing multiple repetitions of a RACH message 3 (also referred to herein as "Msg 3"), which increases the likelihood that the RACH message 3 will be received correctly. In some implementations, the base station may transmit, using a first transmit beam, a random access message 2 (also referred to herein as "Msg 2") indicating that the UE is to repeat the random access message 3. Based on the indication, the base station may utilize a different beam to receive each of the repetitions of the message 3. For each of the repetitions of the RACH message 3, the base station may measure channel conditions using the respective receive beam associated with receiving the repetition, and select one of the receive beams as a refined beam for receiving uplink transmissions from the UE. Additionally, in some examples, the base station may select a sub-beam of a transmit beam used for the RACH message 2 as a refined beam for transmitting a RACH message 4 (also referred to herein as "Msg 4"). For example, the base station may select a sub-beam within the aperture of the transmit beam that corresponds to the selected receive beam. Selection of refined beams may improve the likelihood of successful reception of the subsequent messages.

Particular implementations of the subject matter described in this disclosure can be implemented to realize one or more of the following potential advantages. In some implementations, the described techniques can be used to improve reliability of the RACH procedure, and thus, ensure the establishment of a communication connection between a UE and a base station. For example, by transmitting multiple repetitions of a RACH message 3, the UE can increase the likelihood that the base station successfully receives the RACH message 3 even when the UE is operating near an edge of a cell of the base station. Further, by selecting a refined beam for transmitting the RACH message 4, the base station can increase the likelihood that the UE successfully receives the RACH message 4. The base station may conserve transmission resources by indicating when the UE is to transmit the multiple repetitions or how many repetitions to transmit.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

In an aspect, one or more of the UEs 104 may include a UE RACH component 140 configured to perform a RACH procedure including transmitting a random access message 3. The UE RACH component 140 may include a random access response (RAR) receiving component 142 configured to receive, using a first receive beam, a random access message 2 indicating multiple repetitions of a random access message 3, a repetition component 144 configured to transmit the random access message 3 for a number of repetitions, and a contention resolution component 145 configured to receive a random access message 4 that is transmitted on a refined transmit beam corresponding to a sub-beam of the first receive beam.

In an aspect, one or more of the base stations 102 may include a base station (BS) RACH component 198 configured to receive the repetitions of the random access message 3. The BS RACH component 198 may include a RAR transmitting component 146 configured to transmit, via a first transmit beam, a random access message 2 indicating multiple repetitions of a random access message 3 based on the indication in the random access message 2; a beam selection component 148 configured to receive a number of repetitions of the random access message 3 using a different refined beam for each of the repetitions; and a refined transmission component 149 configured to transmit a random access message 4 via a second transmit beam corresponding to a sub-beam of the first transmit beam based on at least one of the number of repetitions of the random access message 3.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102a may have a coverage area 110a that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102a may operate in a licensed or an unlicensed frequency spectrum. When operating in an unlicensed frequency spectrum, the small cell 102a may employ NR and use the same 5 GHz unlicensed frequency spectrum as used by the Wi-Fi AP 150. The small cell 102a, employing NR in an unlicensed frequency spectrum, may boost coverage to or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182a. The UE 104 may receive the beamformed signal from the base station 180 in one or more receive directions 182b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
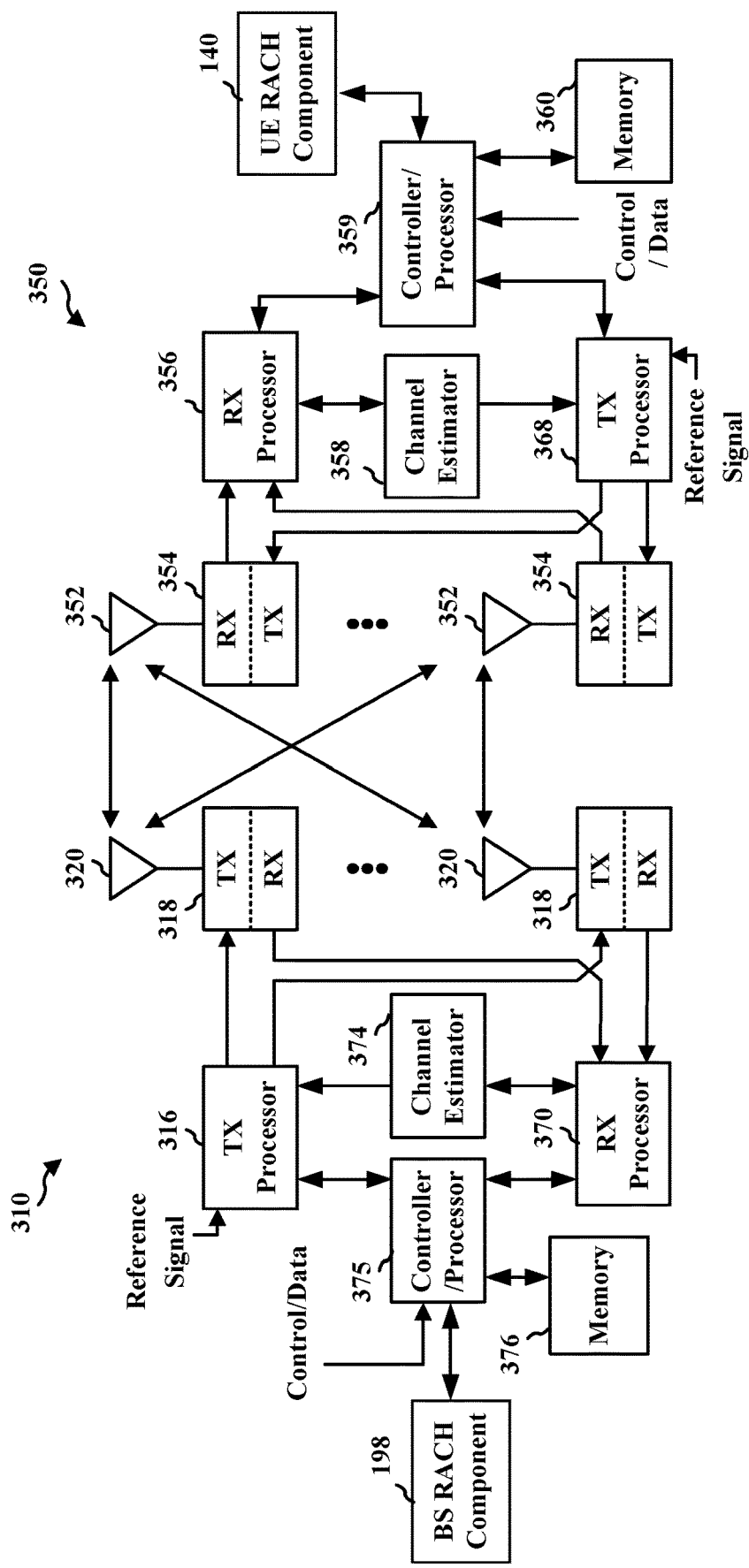
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TB s), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (for example, MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with the UE RACH component 140 of FIG. 1.

At least one of the TX processor 316, the RX processor 370, and the controller/processor 375 may be configured to perform aspects in connection with the BS RACH component 198 of FIG. 1.

Figure 4:
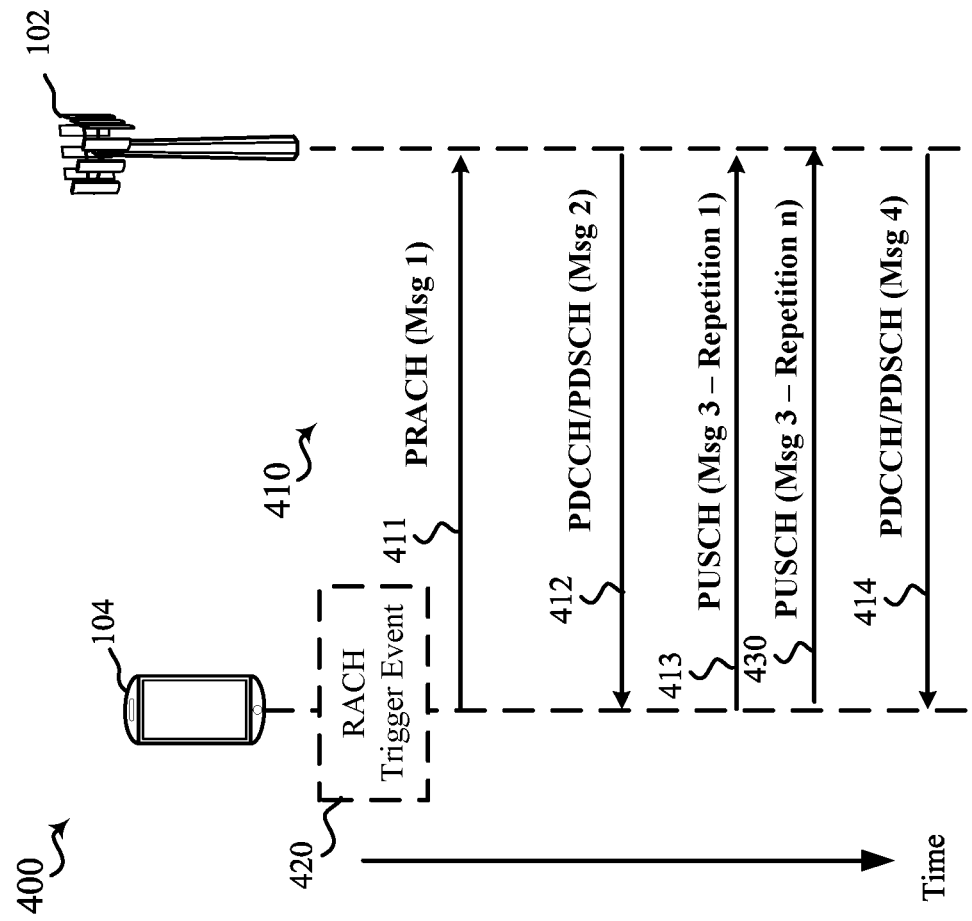
FIG. 4 is a diagram illustrating an example message exchange for a random access channel (RACH) procedure between a base station and a UE in an access network.

FIG. 4 is a diagram 400 illustrating an example message exchange for a RACH procedure between a base station 102 and a UE 104 in an access network. The UE 104 may be an NR-Light UE and include a UE RACH component 140. The base station 102 may include a BS RACH component 198.

Referring additionally to Table 1 (below), during operation, UE 104 may execute an implementation of an NR RACH procedure 410, according to a 4-step NR RACH message flow, due to the occurrence of one or more RACH trigger events 420. Suitable examples of RACH trigger events 420 may include, but are not limited to: (i) the UE 104 performing an initial access to transition from an RRC_IDLE state to RRC_CONNECTED ACTIVE state; (ii) the UE 104 detecting downlink (DL) data arrival while in an RRC_IDLE state or RRC_CONNECTED INACTIVE state; (iii) the UE 104 determining UL data arrival from higher layers during RRC_IDLE state or RRC_CONNECTED INACTIVE state; (iv) the UE 104 performing a handover from another station to the base station 102 during the connected mode of operation; and (v) the UE performing a connection re-establishment procedure such as a beam failure recovery procedure.

The NR RACH procedure 410 may be associated with a contention-based random access procedure, or with a contention-free random access procedure. In an implementation, a contention-based NR RACH procedure corresponds to the following RACH trigger events 420: an initial access from RRC_IDLE to RRC_CONNECTED ACTIVE; UL data arrival during RRC_IDLE or RRC_CONNECTED INACTIVE; and a connection re-establishment. In an implementation, a contention-free NR RACH procedure corresponds to the following RACH trigger events 420: downlink (DL) data arrival during RRC_IDLE or RRC_CONNECTED INACTIVE; and, a handover during the connected mode of operation.

On the occurrence of any of the above RACH trigger events 420, the execution of the NR RACH procedure 410 may include the 4-step NR RACH message flow (see FIG. 4 and Table 1), where UE 104 exchanges messages with one or more base stations 102 to gain access to a wireless network and establish a communication connection. The messages may be referred to as random access messages 1 to 4, RACH messages 1 to 4, or may alternatively be referred to by the PHY channel carrying the message, for example, message 3 PUSCH.

TABLE 1

NR RACH procedure, including Messages and Message Content transmitted over corresponding Physical (PHY) channel(s).

| PHY Channel | Message | Message content |
|---|---|---|
| PRACH | Msg 1 | RACH Preamble |
| PDCCH/ PDSCH | Msg 2 | Detected RACH preamble ID, TA, TC-RNTI, backoff indicator, UL/DL grants |
| PUSCH | Msg 3 | RRC Connection request (or scheduling request and tracking area update) |
| PDCCH/ PDSCH | Msg 4 | Contention resolution message |

At 411, for example, UE 104 may transmit a first message (Msg 1), which may be referred to as a random access request message, to one or more base stations 102 via a physical channel, such as a physical random access channel (PRACH). For example, Msg 1 may include one or more of a RACH preamble and a resource requirement. In an aspect, the RACH preamble may be a relatively long preamble sequence, which may be easier for the base station 102 to receive than an OFDM symbol. In an aspect, the UE RACH component 140 may select a beam for transmission of the Msg 1 based on received synchronization signal blocks (SSBs) transmitted by the base station 102.

At 412, one of more of the base stations 102 may respond to Msg 1 by transmitting a second message (Msg 2), which may be referred to as a random access response (RAR) message, over a physical downlink control channel (PDCCH) and a physical downlink shared channel (PDSCH). For example, Msg 2 may include one or more of a detected preamble identifier (ID), a timing advance (TA) value, a temporary cell radio network temporary identifier (TC-RNTI), a backoff indicator, an UL grant, or a DL grant. The base station 102 may select a beam for the Msg 2 based on the preamble sequence of the Msg 1. In an aspect, the RAR receiving component 142 may receive the RAR message. The RAR receiving component 142 may monitor the PDCCH during a monitoring window based on the Msg 1 to detect a PDCCH portion of the RAR message as a DCI format 1_0 with a CRC scrambled by the corresponding RA-RNTI and receive a PDSCH portion of the RAR message as a transport block in a corresponding PDSCH within the window. The RAR receiving component 142 may pass the transport block to higher layers, which may parse the transport block for a random access preamble identity (RAPID) associated with the Msg 1. If the higher layers identify the RAPID in the transport block, the higher layers indicate an uplink grant to the RAR receiving component 142 at the physical layer. This is referred to as RAR UL grant in the physical layer.

At 413, in response to receiving Msg 2, the repetition component 144 transmits to the base station 102 a third message (Msg 3), which may be an RRC connection request or a scheduling request, via a physical uplink channel such as PUSCH based on the RAR UL grant provided in Msg 2 of the base station 102. In an aspect, a UE that is experiencing conditions that may result in poor reception of the Msg 3 by a base station 102 may use repetitions to enhance reception of the Msg 3 and further RACH messages by the base station 102. For example, if the UE is an NR-Light UE that has relatively low transmission power, repetition of the Msg 3 may improve reception of the Msg 3 at the base station 102. Other conditions that may result in poor reception of the Msg 3 may include the use of high frequencies (such as carriers in the mmWave band), an obstructed line of sight, or interference.

At 430, the UE 104 may transmit up to n repetitions of Msg 3. In an aspect, each repetition may be received at the base station 102 using a different receive beam. The beams may be sub-beams of a previously determined beam. Accordingly, the beams may refine the previously determined beam and one or more of the repetitions may be received with greater power or quality. In an aspect, the BS RACH component 198 may determine whether the UE 104 is to repeat the Msg 3 PUSCH based on detection of a beam enhancement condition. For example, the BS RACH component 198 may determine whether the UE 104 is to repeat the Msg 3 based on a signal strength of the Msg 1. For instance, the BS RACH component 198 may indicate repetition of the Msg 3 when the signal strength of the Msg 1 is less than a threshold.

At 414, in response to receiving Msg 3, BS RACH component 198 may transmit a fourth message (Msg 4), which may be referred to as a contention resolution message, to UE 104 via a PDCCH and a PDSCH. For example, Msg 4 may include a cell radio network temporary identifier (C-RNTI) for UE 104 to use in subsequent communications. In an aspect, the beam selection component 148 may select a beam for transmission of the Msg 4 based on which repetition of the Msg 3 is the strongest.

In some example scenarios, a collision between two or more UEs 104 requesting access can occur. For instance, two or more UEs 104 may send Msg 1 having a same RACH preamble because the number of RACH preambles may be limited and may be randomly selected by each UE 104 in a contention-based NR RACH procedure. As such, each colliding UE 104 that selects the same RACH preamble will receive the same temporary C-RNTI and the same UL grant, and thus each UE 104 may send a similar Msg 3. In this case, base station 102 may resolve the collision in one or more ways. In a first scenario, a respective Msg 3 from each colliding UE 104 may interfere with the other Msg 3, so base station 102 may not send Msg 4. Then each UE 104 will retransmit Msg 1 with a different RACH preamble. In a second scenario, base station 102 may successfully decode only one Msg 3 and send an ACK message to the UE 104 corresponding to the successfully decoded Msg 3. In a third scenario, base station 102 may successfully decode the Msg 3 from each colliding UE 104, and then send a Msg 4 having a contention resolution identifier (such as an identifier tied to one of the UEs) to each of the colliding UEs. Each colliding UE 104 receives the Msg 4, decodes the Msg 4, and determines if the UE 104 is the correct UE by successfully matching or identifying the contention resolution identifier. Such a problem may not occur in a contention-free NR RACH procedure, as in that case, base station 102 may inform UE 104 of which RACH preamble to use.

Figure 5:
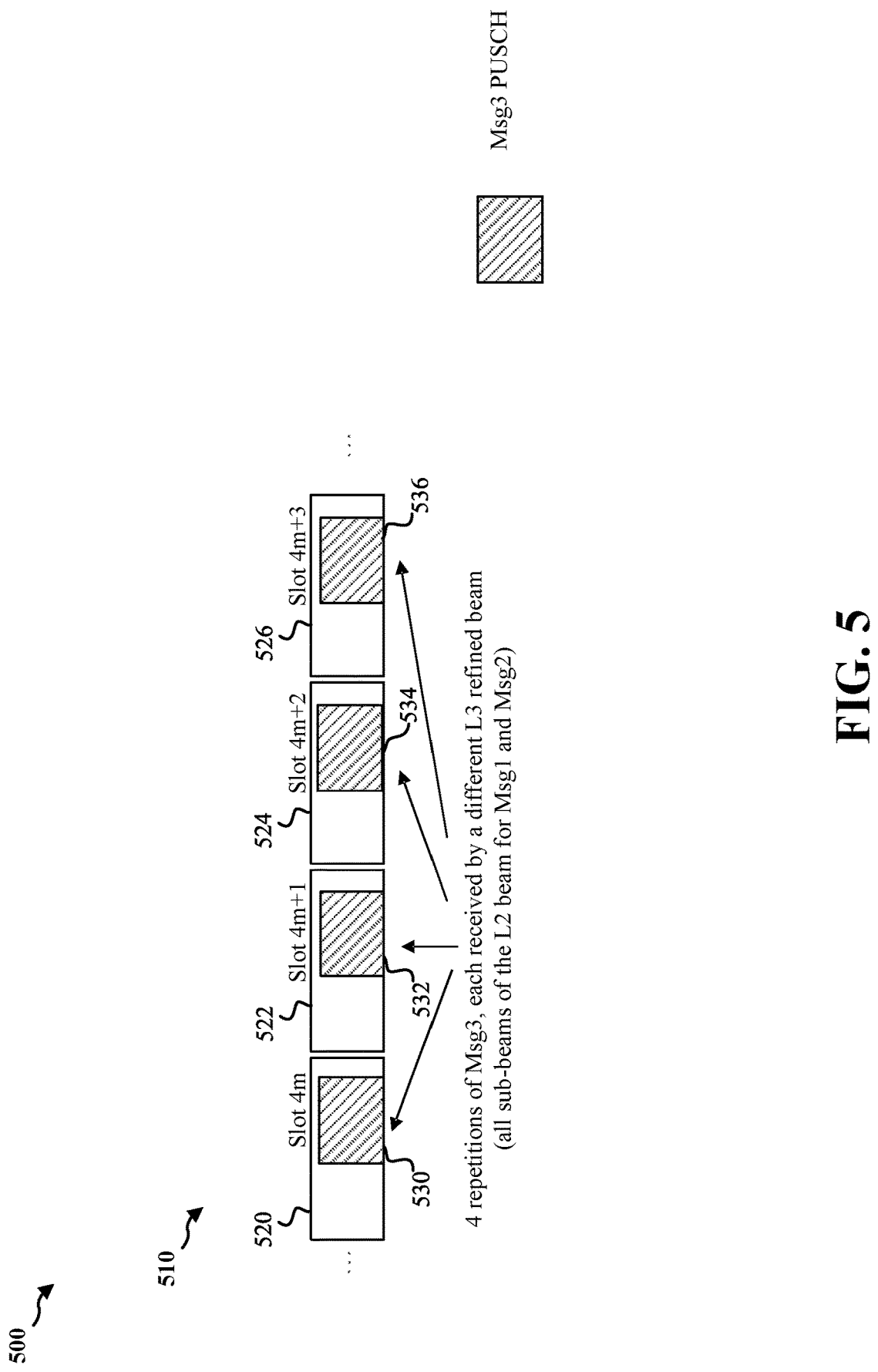
FIG. 5 is a diagram illustrating example resources for repetition of a random access message 3.

FIG. 5 is a diagram 500 illustrating example resources for repetition of a random access message 3. The resources 510 may be located within consecutive slots 520, 522, 524, and 526. The UE 104 may transmit a repetition 530, 532, 534, 536 of the Msg 3 in each slot 520, 522, 524, and 526. That is, each repetition 530, 532, 534, and 536 may include the same data. Each repetition 530, 532, 534, and 536 may use the same transmit beam from the UE 104. The base station 102 may utilize different refined sub-beams to receive each repetition 530, 532, 534, and 536 in the respective slot 520, 522, 524, and 526. A refined sub-beam may refer to a lower level beam in a hierarchical set of beams. For example, a layer 1 (L1) beam may cover multiple L2 beams, which may each cover multiple L3 beams. In other words, the refined sub-beam may have a narrower aperture included within a wider aperture of the higher level beam. In an implementation, the beams corresponding to Msg 1 and Msg 2 are L2 beams and each of the different refined sub-beams beams is an L3 beam. The L3 refined beams may be based on an L2 beam used for the Msg 1 and the Msg 2. That is, the base station 102 may generate different sub-beams of the L2 beam to attempt to improve reception of the Msg 3.

In an aspect, the base station 102 may select one of the received repetitions 530, 532, 534, and 536 based on one or more criteria. For example, the base station 102 may determine which one of the received repetitions 530, 532, 534, and 536 is the strongest and select that repetition. In a first implementation, the base station 102 may detect each repetition of the Msg 3 separately using a corresponding refined beam for each repetition. That is, the base station 102 may receive a signal for each repetition 530, 532, 534, and 536 using a respective refined beam and attempt to decode the Msg 3 based on only the signal received with the respective refined beam. The base station 102 may determine a signal power such as a received signal strength indicator (RSSI) for each repetition 530, 532, 534, and 536.

In a second implementation, the base station 102 may improve the likelihood of detection by soft combining the signals received via each of the different refined beams. That is, the base station 102 may soft combine the received signals for the repetitions 530, 532, 534, and 536 to determine the Msg 3. The base station 102 may then determine a reference signal received power (RSRP) for each repetition 530, 532, 534, and 536 based on the Msg 3. For example, the base station 102 may use the decoded Msg 3 as a reference signal and compare each repetition 530, 532, 534, and 536 to the reference signal. Accordingly, the RSRP may indicate a quality of each reference signal. In either the first implementation or the second implementation, the base station 102 may select a beam corresponding to one of the repetitions 530, 532, 534, and 536 (for example, the repetition having the strongest RSSI or RSRP) to use for the Msg 4.

In an aspect, the base station 102 may indicate repetition parameters in the Msg 2. For example, the indication to use Msg 3 repetition, as well as an indication of the number of repetitions to use, may be indicated in Msg 2 PDCCH. The Msg 2 PDSCH may additionally or alternatively provide an indication to use Msg 3 repetition, as well as an indication of the number of repetitions to use, or an indication of the associated resources for repetition. For example, the resources may utilize frequency hopping to improve diversity. The Msg 2 PDSCH may indicate a frequency hopping pattern or specific frequency-domain resources.

Figure 6:
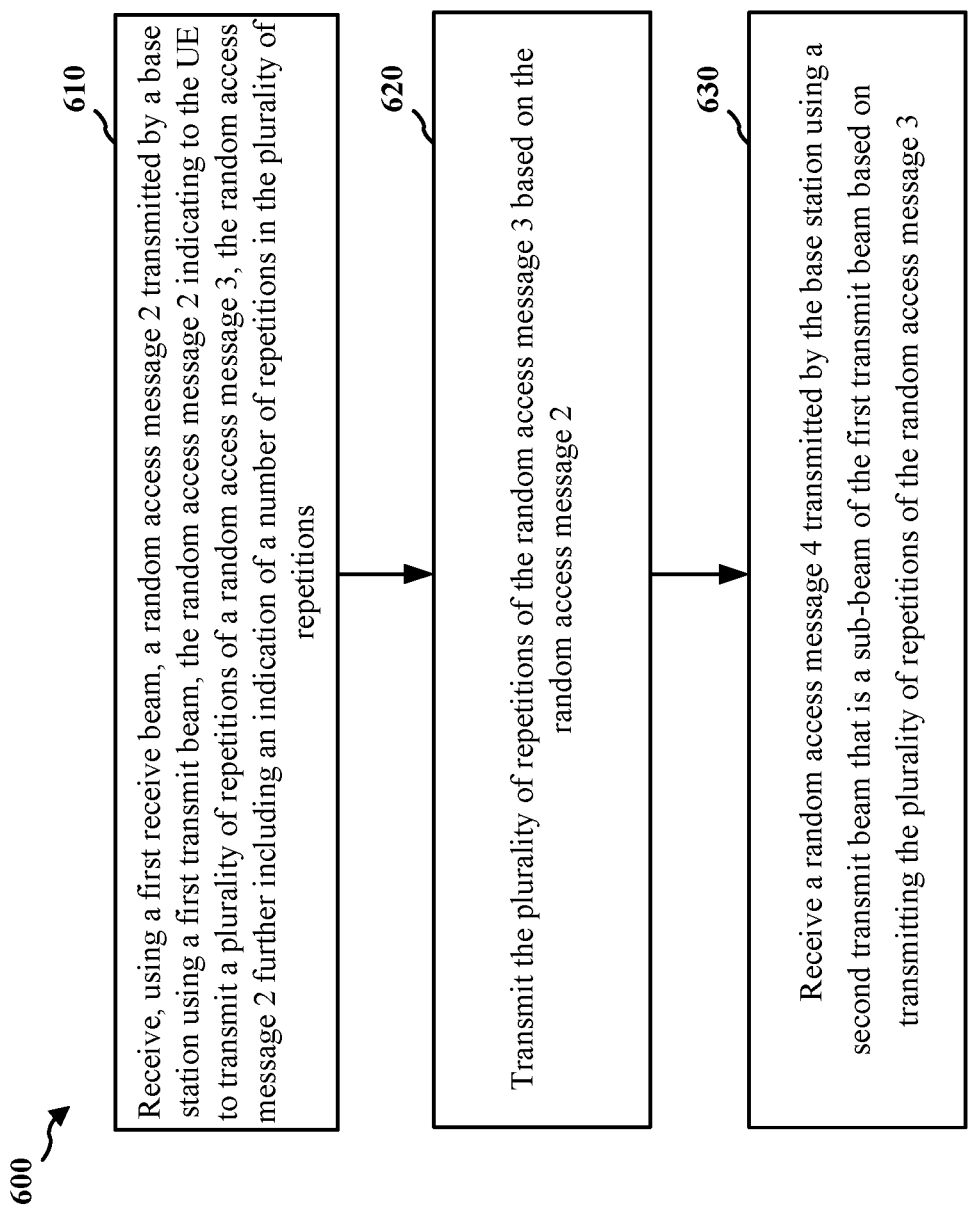
FIG. 6 is a flowchart of an example method for transmitting a random access message 3 during a RACH procedure.

FIG. 6 is a flowchart of an example method 600 for transmitting a random access message 3 during a RACH procedure. The method 600 may be performed by a UE (such as the UE 104, which may include the memory 360 and which may be the entire UE 104 or a component of the UE 104 such as the UE RACH component 140, TX processor 368, the RX processor 356, or the controller/processor 359). The method 600 may be performed by the UE RACH component 140 in communication with the BS RACH component 198 of the base station 102.

In block 610, the method 600 may include receiving, using a first receive beam, a random access message 2 transmitted by a base station using a first transmit beam, the random access message 2 indicating to the UE to transmit a plurality of repetitions of a random access message 3, the random access message 2 further including an indication of a number of repetitions in the plurality of repetitions. In an aspect, for example, the UE 104, the RX processor 356 or the controller/processor 359 may execute the UE RACH component 140 or the RAR receiving component 142 to receive, using a first receive beam, a random access message 2 indicating to the UE to transmit a plurality of repetitions of a random access message 3. The random access message 2 may further include an indication of a number of repetitions in the plurality of repetitions. For example, the RAR receiving component 142 may receive a PDCCH portion of the random access message 2, determine that a CRC of a DCI on the PDCCH is scrambled with a RA-RNTI, determine a corresponding PDSCH transport block, pass the transport block to higher layers, and receive the PDSCH portion of the random access message 2 from the higher layers. In an aspect, the random access message 2 may indicate that the UE is to transmit the plurality of repetitions of a random access message 3. The PDCCH may indicate a number of the plurality of repetitions. In another aspect, the random access message 2 indicates that the UE is to transmit the plurality of repetitions of the random access message 3 in a PDSCH. The PDSCH may indicate the number of the plurality of repetitions or resources for the repetitions. Accordingly, the UE 104, RX processor 356, or the controller/processor 359 executing the UE RACH component 140 or the RAR receiving component 142 may provide means for receiving, using a first receive beam a random access message 2 transmitted by a base station using a first transmit beam.

In block 620, the method 600 may include transmitting the plurality of repetitions of the random access message 3 based on the random access message 2. In an aspect, for example, the UE 104, the controller/processor 359, or the TX processor 368 may execute the UE RACH component 140 or the repetition component 144 to transmit the plurality of repetitions of the random access message 3 based on the random access message 2. The repetition component 144 may repeat the message 3 based on the number of the plurality of repetitions. In an aspect, transmitting the plurality of repetitions of the random access message 3 may include transmitting the plurality of repetitions using a frequency hopping pattern. Accordingly, the UE 104, TX processor 368 or the controller/processor 359 executing the UE RACH component 140 or the repetition component 144 may provide means for transmitting the plurality of repetitions of the random access message 3 based on the random access message 2.

In block 630, the method 600 may include receiving a random access message 4 that is transmitted by the base station using a second transmit beam that is a sub-beam of the first transmit beam based on transmitting the plurality of repetitions of the random access message 3. In an aspect, for example, the UE 104, the RX processor 356 or the controller/processor 359 may execute the UE RACH component 140 or the contention resolution component 145 to receive a random access message 4 that is transmitted by the base station 102 on a second transmit beam that is a sub-beam of the first transmit beam based on transmitting the plurality of repetitions of the random access message 3. In an aspect, the second transmit beam is a refined beam having a narrower aperture included within a wider aperture of the first transmit beam. In an aspect, the first receive beam is a level 2 beam in a set of hierarchical beams and the second transmit beam is a level 3 beam in the set of hierarchical beams. Accordingly, the UE 104, RX processor 356 or the controller/processor 359 executing the UE RACH component 140 or the contention resolution component 145 may provide means for receiving a random access message 4 that is transmitted by the base station using a second transmit beam that is a sub-beam of the first transmit beam based on transmitting the plurality of repetitions of the random access message 3.

Figure 7:
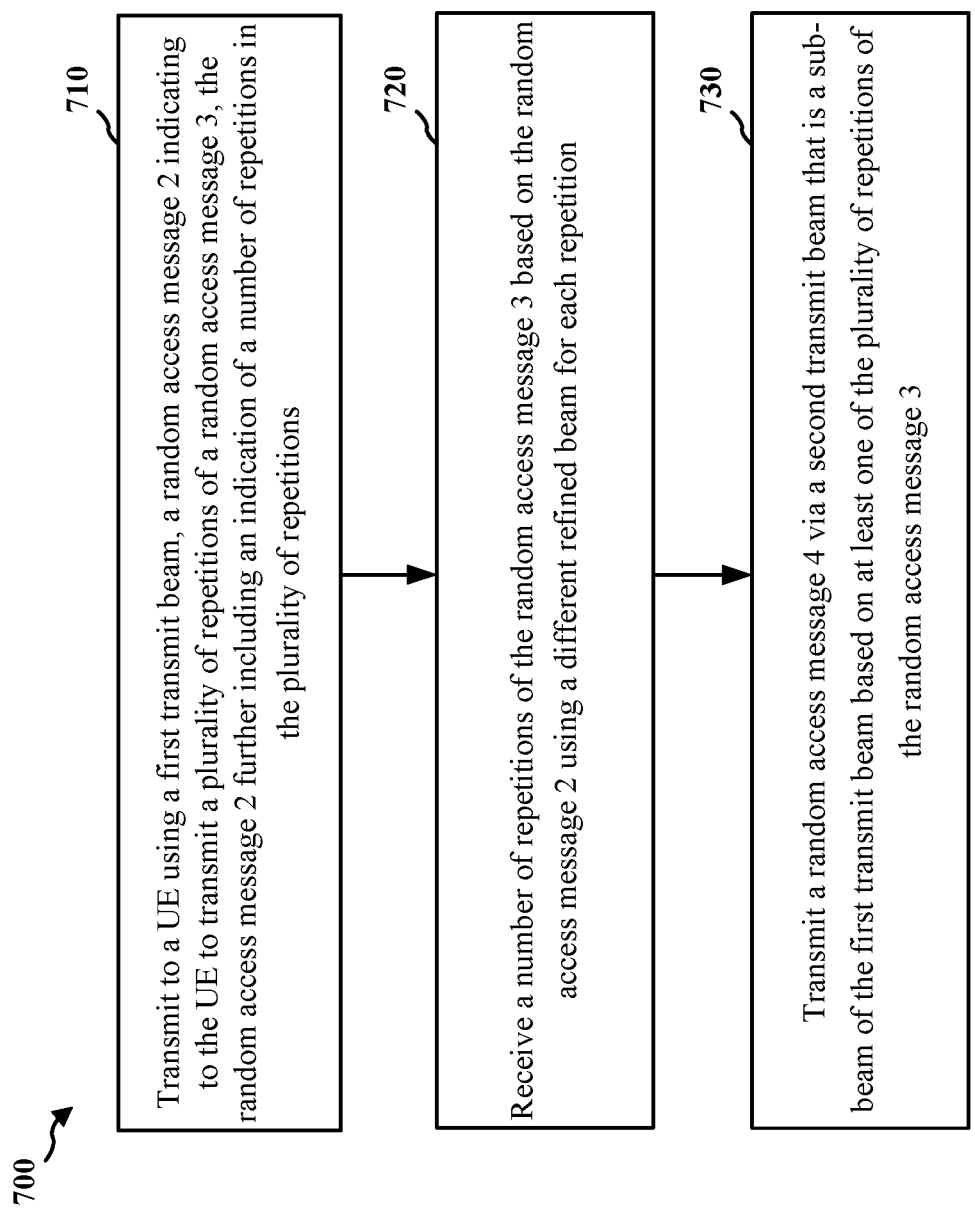
FIG. 7 is a flowchart of an example method for receiving a random access message 3 during a RACH procedure.

FIG. 7 is a flowchart of an example method 700 for receiving a random access message 3 during a RACH procedure. The method 700 may be performed by a base station (such as the base station 102, which may include the memory 376 and which may be the entire base station 102 or a component of the base station 102 such as the BS RACH component 198, TX processor 316, the RX processor 370, or the controller/processor 375). The method 700 may be performed by the BS RACH component 198 in communication with the UE RACH component 140 of the UE 104.

In block 710, the method 700 may include transmitting to a UE, using a first transmit beam, a random access message 2 indicating to the UE to transmit a plurality of repetitions of a random access message 3, the random access message 2 further including an indication of a number of repetitions in the plurality of repetitions. In an aspect, for example, the base station 102, the TX processor 316, or the controller/processor 375 may execute the BS RACH component 198 or the RAR transmitting component 146 to transmit to the UE 104 using the first transmit beam, a random access message 2 indicating to the UE to transmit a plurality of repetitions of a random access message 3. The random access message 2 may further include an indication of a number of repetitions in the plurality of repetitions. Accordingly, the base station 102, the TX processor 316, or the controller/processor 375 executing the BS RACH component 198 or the RAR transmitting component 146 may provide means for transmitting to a UE, using a first transmit beam, a random access message 2 indicating to the UE to transmit a plurality of repetitions of a random access message 3.

In block 720, the method 700 may include receiving a number of repetitions of the random access message 3 based on the random access message 2 using a different refined beam for each repetition. In an aspect, for example, the base station 102, the RX processor 370, or the controller/processor 375 may execute the BS RACH component 198 or the beam selection component 148 to receive the number of repetitions of the random access message 3 based on the random access message 2 using a different refined beam for each repetition. In an aspect, receiving the random access message 3 for the number of repetitions may include receiving the repetitions using a frequency hopping pattern. Accordingly, the base station 102, the RX processor 370, or the controller/processor 375 executing the BS RACH component 198 or the beam selection component 148 may provide means for receiving a number of repetitions of the random access message 3 based on the random access message 2 using a different refined beam for each repetition.

In block 730, the method 700 may include transmitting a random access message 4 via a second transmit beam that is a sub-beam of the first transmit beam based on at least one of the plurality of repetitions of the random access message 3. In an aspect, for example, the base station 102, the TX processor 316, or the controller/processor 375 may execute the BS RACH component 198 or the refined transmission component 149 to transmit the random access message 4 via a second transmit beam that is a sub-beam of the first transmit beam based on at least one of the plurality of repetitions of the random access message 3. Accordingly, the base station 102, the TX processor 316, or the controller/processor 375 executing the BS RACH component 198 or the refined transmission component 149 may provide means for transmitting a random access message 4 via a second transmit beam that is a sub-beam of the first transmit beam based on at least one of the plurality of repetitions of the random access message 3.

Figure 8:
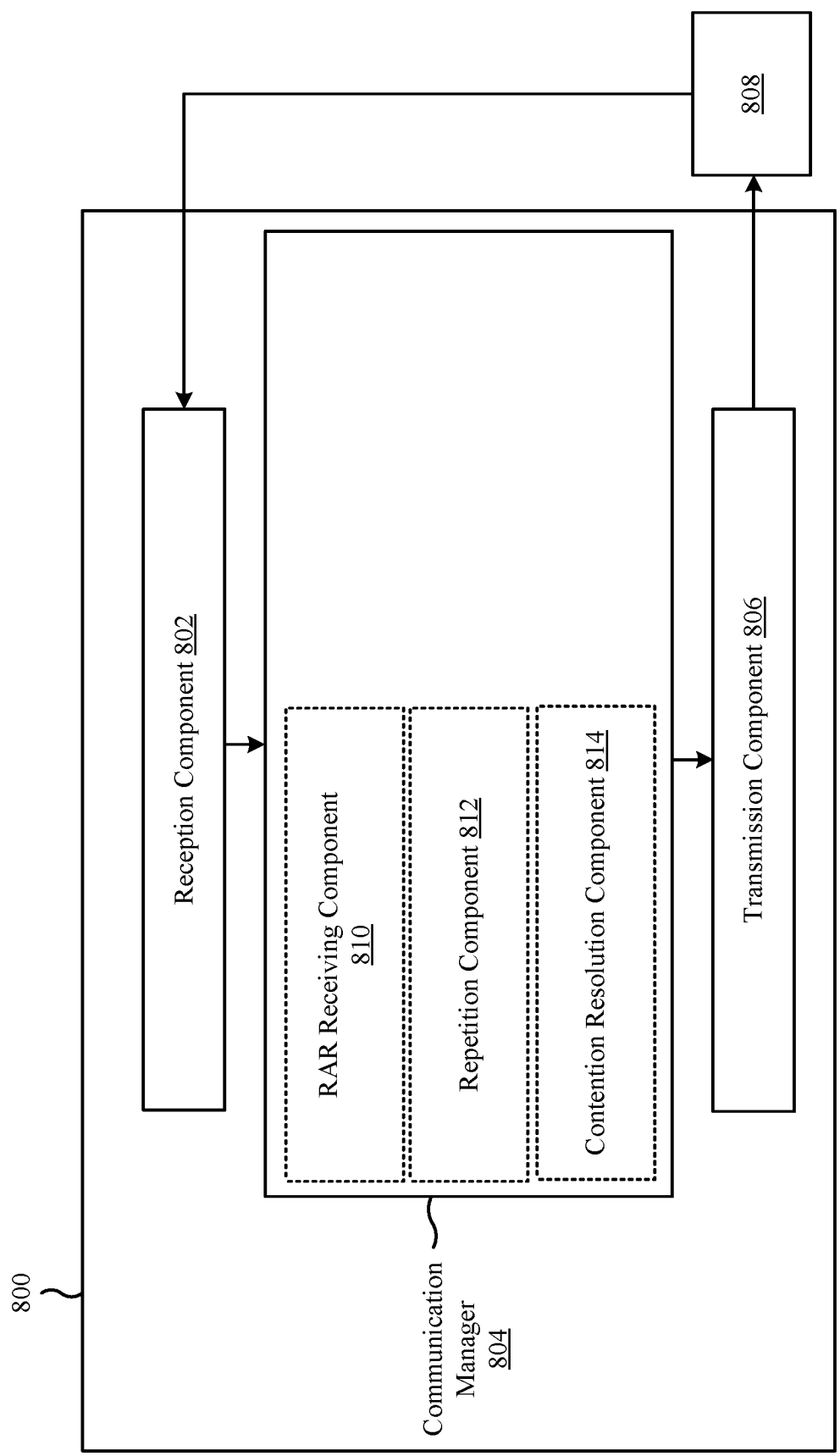
FIG. 8 is a block diagram of an example apparatus such as a UE, for wireless communication.

FIG. 8 is a block diagram of an example apparatus 800 for wireless communication. The apparatus 800 may be a UE or a UE may include the apparatus 800. In some aspects, the apparatus 800 includes a reception component 802, a communication manager 804, and a transmission component 806, which may be in communication with one another (for example, via one or more buses). As shown, the apparatus 800 may communicate with another apparatus 808 (such as a UE, a base station, or another wireless communication device) using the reception component 802 and the transmission component 806.

In some aspects, the apparatus 800 may be configured to perform one or more operations described herein in connection with FIGS. 4 and 5. Additionally or alternatively, the apparatus 800 may be configured to perform one or more processes described herein, such as method 600 of FIG. 6. In some aspects, the apparatus 800 may include one or more components of the UE described above in connection with FIG. 1.

The reception component 802 may receive communications, such as reference signals, control information, data communications, or a combination thereof, from the apparatus 808. The reception component 802 may provide received communications to one or more other components of the apparatus 800, such as the communication manager 804. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a demodulator, a MIMO detector, a receive processor, a controller/processor, a memory, or a combination thereof, of the UE described above in connection with FIG. 1.

The transmission component 806 may transmit communications, such as reference signals, control information, data communications, or a combination thereof, to the apparatus 808. In some aspects, the communication manager 804 may generate communications and may transmit the generated communications to the transmission component 806 for transmission to the apparatus 808. In some aspects, the transmission component 806 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 806 may include one or more antennas, a modulator, a transmit MIMO processor, a transmit processor, a controller/processor, a memory, or a combination thereof, of the UE described above in connection with FIG. 1. In some aspects, the transmission component 806 may be collocated with the reception component 802 in a transceiver.

The communication manager 804 may receive, using a first receive beam, a random access message 2 indicating multiple repetitions of a random access message 3; transmit the random access message 3 for a number of repetitions; and receive a random access message 4 that is transmitted on a refined transmit beam corresponding to a sub-beam of the first receive beam. In some aspects, the communication manager 804 may include a controller/processor, a memory, or a combination thereof, of the UE described above in connection with FIG. 1.

In some aspects, the communication manager 804 may include a set of components, such as a RAR receiving component 810, a repetition component 812, and a contention resolution component 814 or a combination thereof. Alternatively, the set of components may be separate and distinct from the communication manager 804. In some aspects, one or more components of the set of components may include or may be implemented within a controller/processor, a memory, or a combination thereof, of the UE described above in connection with FIG. 1. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The RAR receiving component 810 may receive using a first receive beam, a random access message 2 indicating multiple repetitions of a random access message 3. The repetition component 812 may transmit the random access message 3 for a number of repetitions. The contention resolution component 814 may receive a random access message 4 that is transmitted on a refined transmit beam corresponding to a sub-beam of the first receive beam.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
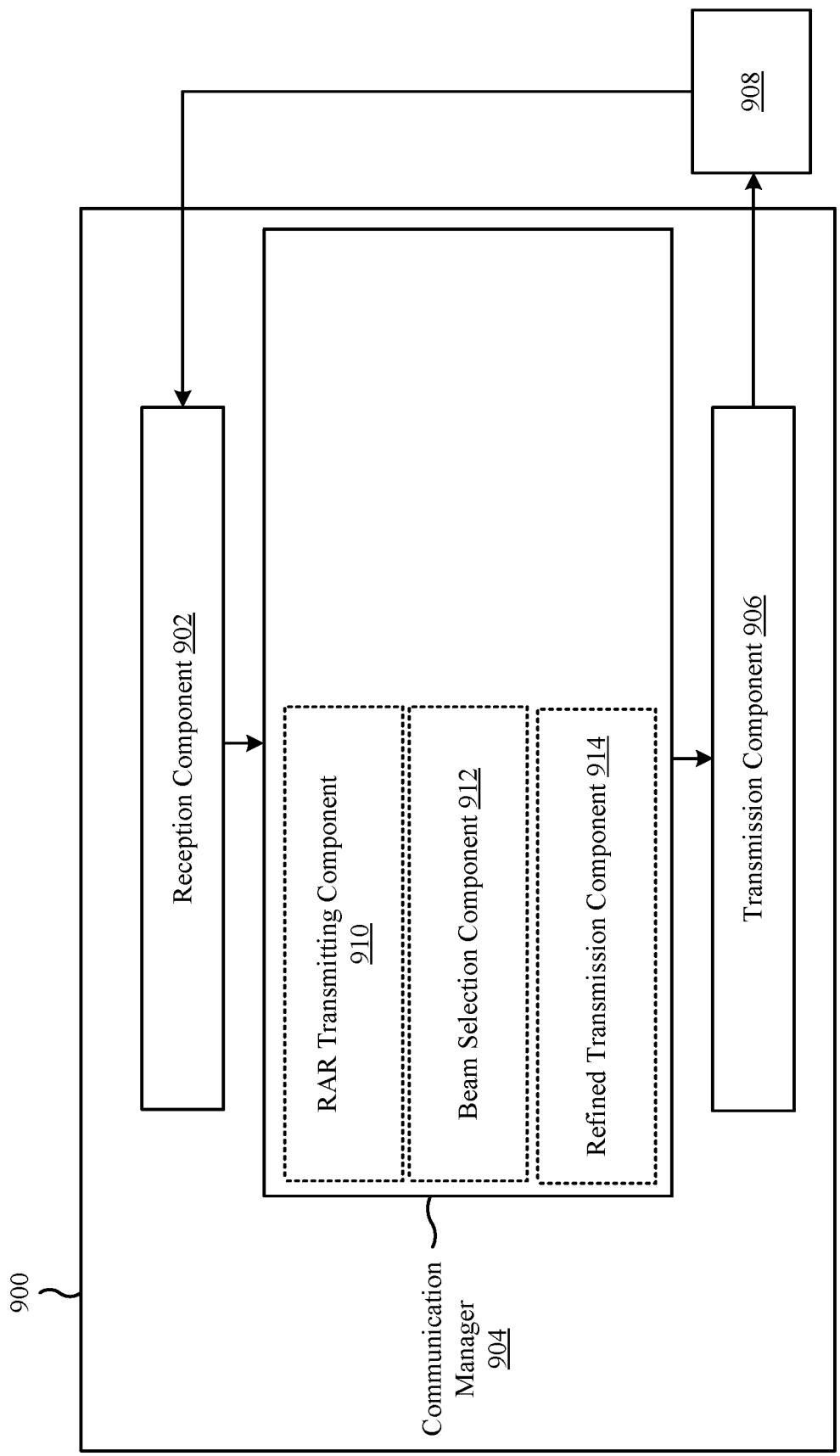
FIG. 9 is a block diagram of an example apparatus such as a base station, for wireless communication.

FIG. 9 is a block diagram of an example apparatus 900 for wireless communication. The apparatus 900 may be a base station or a base station may include the apparatus 900. In some aspects, the apparatus 900 includes a reception component 902, a communication manager 904, and a transmission component 906, which may be in communication with one another (for example, via one or more buses). As shown, the apparatus 900 may communicate with another apparatus 908 (such as a UE, a base station, or another wireless communication device) using the reception component 902 and the transmission component 906.

In some aspects, the apparatus 900 may be configured to perform one or more operations described herein in connection with FIGS. 4 and 5. Additionally or alternatively, the apparatus 900 may be configured to perform one or more processes described herein, such as method 700 of FIG. 7. In some aspects, the apparatus 900 may include one or more components of the base station described above in connection with FIG. 1.

The reception component 902 may receive communications, such as reference signals, control information, data communications, or a combination thereof, from the apparatus 908. The reception component 902 may provide received communications to one or more other components of the apparatus 900, such as the communication manager 904. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the base station described above in connection with FIG. 1.

The transmission component 906 may transmit communications, such as reference signals, control information, data communications, or a combination thereof, to the apparatus 908. In some aspects, the communication manager 904 may generate communications and may transmit the generated communications to the transmission component 906 for transmission to the apparatus 908. In some aspects, the transmission component 906 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 906 may include one or more antennas, a modulator, a transmit MIMO processor, a transmit processor, a controller/processor, a memory, or a combination thereof, of the base station described above in connection with FIG. 1. In some aspects, the transmission component 906 may be collocated with the reception component 902 in a transceiver.

The communication manager 904 may transmit a random access message 2 indicating multiple repetitions of a random access message 3; and receive the random access message 3 for a number of repetitions, each repetition using a different refined beam. In some aspects, the communication manager 904 may include a controller/processor, a memory, a scheduler, a communication unit, or a combination thereof, of the base station described above in connection with FIG. 1.

In some aspects, the communication manager 904 may include a set of components, such as a RAR transmitting component 910, a beam selection component 912, a refined transmission component 914 or a combination thereof. Alternatively, the set of components may be separate and distinct from the communication manager 904. In some aspects, one or more components of the set of components may include or may be implemented within a controller/processor, a memory, a scheduler, a communication unit, or a combination thereof, of the base station described above in connection with FIG. 1. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The RAR transmitting component 910 may transmit a random access message 2 indicating multiple repetitions of a random access message 3. The beam selection component 912 may receive the random access message 3 for a number of repetitions, each repetition using a different refined beam. The refined transmission component 914 may transmit a random access message 4 via a second transmit beam corresponding to a sub-beam of the first transmit beam based on at least one of the number of repetitions of the random access message 3.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 1.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

SOME FURTHER EXAMPLE CLAUSES

Implementation examples are described in the following numbered clauses:

1. A method of wireless communication, including:
   receiving, using a first receive beam, a random access message 2 transmitted by a base station using a first transmit beam, the random access message 2 indicating to the UE to transmit a plurality of repetitions of a random access message 3, the random access message 2 further including an indication of a number of repetitions in the plurality of repetitions;
   transmitting the plurality of repetitions of the random access message 3 based on the random access message 2; and
   receiving a random access message 4 transmitted by the base station using a second transmit beam that is a sub-beam of the first transmit beam based on transmitting the plurality of repetitions of the random access message 3.
2. The method of clause 1, where the second transmit beam is a refined beam having a narrower aperture included within a wider aperture of the first transmit beam.
3. The method of clause 1 or 2, where the random access message 2 indicates to the UE to transmit the plurality of repetitions of the random access message 3 in a physical downlink control channel (PDCCH).
4. The method of clause 3, where the PDCCH indicates the number of repetitions in the plurality of repetitions.
5. The method of clause 1 or 2, where the random access message 2 indicates to the UE to transmit the plurality of repetitions of the random access message 3 in a physical downlink shared channel (PDSCH).
6. The method of clause 5, where the PDSCH indicates the number of repetitions in the plurality of repetitions or resources for the plurality of repetitions.
7. The method of any of clauses 1-6, where transmitting the plurality of repetitions of the random access message 3 includes transmitting the plurality of repetitions using a frequency hopping pattern.
8. The method of any of clauses 1-7, where the first transmit beam is a level 2 beam in a set of hierarchical beams and the second transmit beam is a level 3 beam in the set of hierarchical beams.
9. A method of wireless communication, including:
   transmitting, to a user equipment (UE) using a first transmit beam, a random access message 2 indicating to the UE to transmit a plurality of repetitions of a random access message 3, the random access message 2 further including an indication of a number of repetitions in the plurality of repetitions;
   receiving a number of repetitions of the random access message 3 based on the random access message 2 using a different refined beam for each repetition; and
   transmitting a random access message 4 via a second transmit beam that is a sub-beam of the first transmit beam based on at least one of the plurality of repetitions of the random access message 3.
10. The method of clause 9, the random access message 2 indicates to the UE to transmit the plurality of repetitions of the random access message 3 in a physical downlink control channel (PDCCH).
11. The method of clause 10, where the PDCCH indicates the number of repetitions in the plurality of repetitions.
12. The method of clause 9, where the random access message 2 indicates to the UE to transmit the plurality of repetitions of the random access message 3 in a physical downlink shared channel (PDSCH).
13. The method of clause 12, where the PDSCH indicates the number of repetitions in the plurality of repetitions or resources for the plurality of repetitions.
14. The method of any of clauses 9-13, where receiving the plurality of repetitions of the random access message 3 includes receiving the plurality of repetitions using a frequency hopping pattern.
15. The method of any of clauses 9-14, where each of the different refined beams is a sub-beam of a beam used for a random access message 1 and the random access message 2.
16. The method of any of clauses 9-15, further including:
   receiving each of the plurality of repetitions of the random access message 3 separately; and
   selecting the second transmit beam for transmitting the random access message 4 based on a strongest signal strength of the plurality of repetitions.
17. The method of any of clauses 9-15, further including:
   performing soft combining on the plurality of repetitions to determine a received message 3;
   determining a respective reference signal received power (RSRP) for each of the plurality of repetitions based on the received message 3; and
   selecting the second transmit beam for transmitting the random access message 4 based on a strongest respective RSRP of the plurality of repetitions.
18. The method of any of clauses 9-17, where the second transmit beam is a refined beam having a narrower aperture included within a wider aperture of the first transmit beam.
19. An apparatus for wireless communication, including:
   a memory storing computer executable instructions; and
   at least one processor coupled to the memory and configured to execute the instructions to:
      receive, using a first receive beam, a random access message 2 transmitted by a base station using a first transmit beam, the random access message 2 indicating to the UE to transmit a plurality of repetitions of a random access message 3, the random access message 2 further including an indication of a number of repetitions in the plurality of repetitions;
      transmit the plurality of repetitions of the random access message 3 based on the random access message 2; and
      receive a random access message 4 transmitted by the base station using a second transmit beam that is a sub-beam of the first transmit beam based on transmitting the plurality of repetitions of the random access message 3.
20. The apparatus of clause 19, where the second transmit beam is a refined beam having a narrower aperture included within a wider aperture of the first transmit beam.
21. The apparatus of clause 19 or 20, where the random access message 2 indicates to the UE to transmit the plurality of repetitions of the random access message 3 in a physical downlink control channel (PDCCH).
22. The apparatus of clause 21, where the PDCCH indicates the number of repetitions in the plurality of repetitions.
23. The apparatus of clause 19 or 20, where the random access message 2 indicates to the UE to transmit the plurality of repetitions of the random access message 3 in a physical downlink shared channel (PDSCH).
24. The apparatus of clause 23, where the PDSCH indicates the number of repetitions in the plurality of repetitions or resources for the plurality of repetitions.
25. The apparatus of any of clauses 19-24, where the at least one processor is configured to transmit the plurality of repetitions using a frequency hopping pattern.

26. The apparatus of any of clauses 19-25, where the first transmit beam is a level 2 beam in a set of hierarchical beams and the second transmit beam is a level 3 beam in the set of hierarchical beams.

27. An apparatus for wireless communication, including:
a memory storing computer executable instructions; and
at least one processor coupled to the memory and configured to execute the instructions to:
transmit, to a user equipment (UE) using a first transmit beam, a random access message 2 indicating to the UE to transmit a plurality of repetitions of a random access message 3, the random access message 2 further including an indication of a number of repetitions in the plurality of repetitions;
receive a number of repetitions of the random access message 3 based on the indication in the random access message 2 using a different refined beam for each repetition; and
transmit a random access message 4 via a second transmit beam that is a sub-beam of the first transmit beam based on at least one of the number of repetitions of the random access message 3.

28. The apparatus of clause 27, the random access message 2 indicates to the UE to transmit the plurality of repetitions of the random access message 3 in a physical downlink control channel (PDCCH).

29. The apparatus of clause 28, where the PDCCH the number of repetitions in the plurality of repetitions.

30. The apparatus of clause 27, where the random access message 2 indicates to the UE to transmit the plurality of repetitions of the random access message 3 in a physical downlink shared channel (PDSCH).

31. The apparatus of clause 30, where the PDSCH indicates the number of repetitions or resources for the repetitions.

32. The apparatus of any of clauses 27-31, where the at least one processor is configured to receive the repetitions using a frequency hopping pattern.

33. The apparatus of any of clauses 27-32, where each of the different refined beams is a sub-beam of a beam used for a random access message 1 and the random access message 2.

34. The apparatus of any of clauses 27-33, where the at least one processor is configured to:
receive each of the plurality of repetitions of the random access message 3 separately; and
select the second transmit beam for transmitting the random access message 4 based on a strongest signal strength of the plurality of repetitions.

35. The apparatus of any of clauses 27-33, where the at least one processor is configured to:
perform soft combining on the plurality of repetitions to determine a received message 3;
determine a respective reference signal received power (RSRP) for each of the plurality of repetitions based on the received message 3; and
select the second transmit beam for transmitting the random access message 4 based on a strongest respective RSRP of the plurality of repetitions.

36. The apparatus of any of clauses 27-35, where the second transmit beam is a refined beam having a narrower aperture included within a wider aperture of the first transmit beam.

37. An apparatus for wireless communication, including:
means for receiving, using a first receive beam, a random access message 2 transmitted by a base station using a first transmit beam, the random access message 2 indicating to the UE to transmit a plurality of repetitions of a random access message 3, the random access message 2 further including an indication of a number of repetitions in the plurality of repetitions;
means for the plurality of repetitions of the random access message 3 based on the random access message 2; and
means for receiving a random access message 4 transmitted by the base station using a second transmit beam that is a sub-beam of the first transmit beam based on transmitting the plurality of repetitions of the random access message 3.

38. The apparatus of clause 37, where the second transmit beam is a refined beam having a narrower aperture included within a wider aperture of the first transmit beam.

39. The apparatus of clause 37 or 38, where the random access message 2 indicates to the UE to transmit the plurality of repetitions of the random access message 3 in a physical downlink control channel (PDCCH).

40. The apparatus of clause 39, where the PDCCH indicates the number of repetitions in the plurality of repetitions.

41. The apparatus of clause 37 or 38, where the random access message 2 indicates to the UE to transmit the plurality of repetitions of the random access message 3 in a physical downlink shared channel (PDSCH).

42. The apparatus of clause 41, where the PDSCH indicates the number of repetitions in the plurality of repetitions or resources for the plurality of repetitions.

43. The apparatus of any of clauses 37-42, where the means for transmitting the random access message 3 for the number of repetitions is configured to transmit the repetitions using a frequency hopping pattern.

44. The apparatus of any of clauses 37-43, where the first receive beam is a level 2 refined beam in a set of hierarchical beams and the second transmit beam is a level 3 beam in the set of hierarchical beams.

45. An apparatus for wireless communication, including:
means for transmitting, to a user equipment (UE) using a first transmit beam, a random access message 2 indicating to the UE to transmit a plurality of repetitions of a random access message 3, the random access message 2 further including an indication of a number of repetitions in the plurality of repetitions;
means for receiving a number of repetitions of the random access message 3 based on the random access message 2 using a different refined beam for each repetition; and
means for transmitting a random access message 4 via a second transmit beam that is a sub-beam of the first transmit beam based on at least one of the plurality of repetitions of the random access message 3.

46. The apparatus of clause 45, where the random access message 2 indicates to the UE to transmit the plurality of repetitions of the random access message 3 in a physical downlink control channel (PDCCH).

47. The apparatus of clause 46, where the PDCCH indicates the number of repetitions in the plurality of repetitions.

48. The apparatus of clause 45, where the random access message 2 indicates to the UE to transmit the plurality of repetitions of the random access message 3 in a physical downlink shared channel (PDSCH).

49. The apparatus of clause 48, where the PDSCH indicates the number of repetitions in the plurality of repetitions or resources for the plurality of repetitions.

50. The apparatus of any of clauses 45-49, where the means for receiving the random access message 3 for the number of repetitions is configured to receive the repetitions using a frequency hopping pattern.

51. The apparatus of any of clauses 45-50, where each of the different refined beams is a sub-beam of a beam used for a random access message 1 and the random access message 2.

52. The apparatus of any of clauses 45-51, where the means for receiving is configured to receive each of the plurality of repetitions of the random access message 3 separately and to select the second transmit beam for transmitting the random access message 4 based on a strongest signal strength of the plurality of repetitions.

53. The apparatus of any of clauses 45-51, where the means for receiving is configured to perform soft combining on the plurality of repetitions to determine a received message 3, determine a respective reference signal received power (RSRP) for each of the plurality of repetitions based on the received message 3, and select the second transmit beam for transmitting the random access message 4 based on a strongest respective RSRP of the plurality of repetitions.

54. The apparatus of any of clauses 45-53, where the second transmit beam is a refined beam having a narrower aperture included within a wider aperture of the first transmit beam.

55. A non-transitory computer-readable medium storing computer executable code, the code when executed by a processor cause the processor to:
    receive, using a first receive beam, a random access message 2 transmitted by a base station using a first transmit beam, the random access message 2 indicating to the UE to transmit a plurality of repetitions of a random access message 3, the random access message 2 further including an indication of a number of repetitions in the plurality of repetitions;
    transmit the plurality of repetitions of the random access message 3 based on the random access message 2; and
    receive a random access message 4 transmitted by the base station using a second transmit beam that is a sub-beam of the first transmit beam based on transmitting the plurality of repetitions of the random access message 3.

56. The non-transitory computer-readable medium of clause 55, where the second transmit beam is a refined beam having a narrower aperture included within a wider aperture of the first transmit beam.

57. The non-transitory computer-readable medium of clause 55 or 56, where the random access message 2 indicates to the UE to transmit the plurality of repetitions of the random access message 3 in a physical downlink control channel (PDCCH).

58. The non-transitory computer-readable medium of clause 57, where the PDCCH indicates the number of repetitions in the plurality of repetitions.

59. The non-transitory computer-readable medium of clause 55 or 56, where the random access message 2 indicates to the UE to transmit the plurality of repetitions of the random access message 3 in a physical downlink shared channel (PDSCH).

60. The non-transitory computer-readable medium of clause 59, where the PDSCH indicates the number of repetitions in the plurality of repetitions or resources for the plurality of repetitions.

61. The non-transitory computer-readable medium of any of clauses 55-60, where the code to transmit includes code to transmit the plurality of repetitions using a frequency hopping pattern.

62. The non-transitory computer-readable medium of any of clauses 55-60, where the first transmit beam is a level 2 beam in a set of hierarchical beams and the second transmit beam is a level 3 beam in the set of hierarchical beams.

63. A non-transitory computer-readable medium storing computer executable code, the code when executed by a processor cause the processor to:
    transmit, to a user equipment (UE) using a first transmit beam, a random access message 2 indicating to the UE to transmit a plurality of repetitions of a random access message 3, the random access message 2 further including an indication of a number of repetitions in the plurality of repetitions;
    receive a number of repetitions of the random access message 3 based on the indication in the random access message 2 using a different refined beam for each repetition; and
    transmit a random access message 4 via a second transmit beam that is a sub-beam of the first transmit beam based on at least one of the number of repetitions of the random access message 3.

64. The non-transitory computer-readable medium of clause 63, where the random access message 2 indicates to the UE to transmit the plurality of repetitions of the random access message 3 in a physical downlink control channel (PDCCH).

65. The non-transitory computer-readable medium of clause 64, where the PDCCH the number of repetitions in the plurality of repetitions.

66. The non-transitory computer-readable medium of clause 64, where the random access message 2 indicates to the UE to transmit the plurality of repetitions of the random access message 3 in a physical downlink shared channel (PDSCH).

67. The non-transitory computer-readable medium of clause 66, where the PDSCH indicates the number of repetitions in the plurality of repetitions or resources for the plurality of repetitions.

68. The non-transitory computer-readable medium of any of clauses 63-67, further including code to receive the plurality of repetitions using a frequency hopping pattern.

69. The non-transitory computer-readable medium of any of clauses 63-68, where each of the different refined beams is a sub-beam of a beam used for a random access message 1 and the random access message 2.

70. The non-transitory computer-readable medium of any of clauses 63-69, further including code to:
    receive each of the plurality of repetitions of the random access message 3 separately; and
    select the second transmit beam for transmitting the random access message 4 based on a strongest signal strength of the plurality of repetitions.

71. The non-transitory computer-readable medium of any of clauses 63-69, further including code to:
    perform soft combining on the plurality of repetitions to determine a received message 3; determine a respective reference signal received power (RSRP) for each of the plurality of repetitions based on the received message 3; and select the second transmit beam for transmitting the random access message 4 based on a strongest respective RSRP of the plurality of repetitions.

72. The non-transitory computer-readable medium of any of clauses 63-71, where the second transmit beam is a refined beam having a narrower aperture included within a wider aperture of the first transmit beam.

The previous description is provided to enable any person of ordinary skill in the art to practice the various aspects described herein. Various modifications to these aspects will be readily apparent to those of ordinary skill in the art, and the generic principles defined herein may be applied to other aspects. The claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), comprising:
    receiving, using a first receive beam, a random access message 2 transmitted by a base station using a first transmit beam, the random access message 2 indicating to the UE to transmit a plurality of repetitions of a random access message 3, the random access message 2 further including an indication of a number of repetitions in the plurality of repetitions;
    transmitting, associated with the reception of the random access message 2, the plurality of repetitions of the random access message 3; and
    receiving, associated with the transmission of the plurality of repetitions of the random access message 3, a random access message 4 transmitted by the base station using a second transmit beam that is a sub-beam of the first transmit beam, wherein the first transmit beam is a level 2 beam in a set of hierarchical beams within a level 1 beam, wherein the second transmit beam is a level 3 beam in the set of hierarchical beams within the first transmit beam, and wherein the second transmit beam corresponds to a repetition of the plurality of repetitions of the random access message 3 associated with a strong respective reference signal received power (RSRP).

2. The method of claim 1, wherein the second transmit beam is a refined beam having a narrower aperture included within a wider aperture of the first transmit beam.

3. The method of claim 1, wherein the random access message 2 indicates to the UE to transmit the plurality of repetitions of the random access message 3 in a physical downlink control channel (PDCCH) portion of the random access message 2.

4. The method of claim 3, wherein the PDCCH portion indicates the number of repetitions in the plurality of repetitions.

5. The method of claim 1, wherein the random access message 2 indicates to the UE to transmit the plurality of repetitions of the random access message 3 in a physical downlink shared channel (PDSCH) portion of the random access message 2.

6. The method of claim 5, wherein the PDSCH portion indicates the number of repetitions in the plurality of repetitions or resources for the plurality of repetitions.

7. The method of claim 1, wherein transmitting the plurality of repetitions of the random access message 3 comprises transmitting the plurality of repetitions using a frequency hopping pattern.

8. An apparatus of a user equipment (UE) for wireless communication, comprising:
    a memory storing computer executable instructions; and
    at least one processor coupled to the memory and configured to execute the instructions to:
    receive, using a first receive beam, a random access message 2 transmitted by a base station using a first transmit beam, the random access message 2 indicating to the UE to transmit a plurality of repetitions of a random access message 3, the random access message 2 further including an indication of a number of repetitions in the plurality of repetitions;
    transmit, associated with the reception of the random access message 2, the plurality of repetitions of the random access message 3; and
    receive, associated with the transmission of the plurality of repetitions of the random access message 3, a random access message 4 transmitted by the base station using a second transmit beam that is a sub-beam of the first transmit beam, wherein the first transmit beam is a level 2 beam in a set of hierarchical beams within a level 1 beam, wherein the second transmit beam is a level 3 beam in the set of hierarchical beams within the first transmit beam, and wherein the second transmit beam corresponds to a repetition of the plurality of repetitions of the random access message 3 associated with a strong respective reference signal received power (RSRP).

9. The apparatus of claim 8, wherein the second transmit beam is a refined beam having a narrower aperture included within a wider aperture of the first transmit beam.

10. The apparatus of claim 8, wherein the random access message 2 indicates to the UE to transmit the plurality of repetitions of the random access message in a physical downlink control channel (PDCCH) portion of the random access message 2.

11. The apparatus of claim 10, wherein the PDCCH portion indicates the number of repetitions in the plurality of repetitions.

12. The apparatus of claim 8, wherein the random access message 2 indicates to the UE to transmit the plurality of repetitions of the random access message in a physical downlink shared channel (PDSCH) portion of the random access message 2.

13. The apparatus of claim 12, wherein the PDSCH portion indicates the number of repetitions in the plurality of repetitions or resources for the plurality of repetitions.

14. The apparatus of claim 8, wherein the at least one processor is configured to transmit the plurality of repetitions using a frequency hopping pattern.

15. A method of wireless communication, comprising:
    transmitting, to a user equipment (UE) using a first transmit beam, a random access message 2 indicating to the UE to transmit a plurality of repetitions of a random access message 3, the random access message 2 further including an indication of a number of repetitions in the plurality of repetitions; receiving, associated with the transmission of the random access message 2, the plurality of repetitions of the random access message 3 using a different respective refined beam for each of the plurality of repetitions; selecting a refined second transmit beam associated with the respective refined beam for a one of the repetitions of the plurality of repetitions associated with a strong respective reference signal received power (RSRP), and transmitting a random access message 4 via the refined second transmit beam.

16. The method of claim 15, wherein the random access message 2 indicates to the UE to transmit the plurality of repetitions of the random access message 3 in a physical downlink control channel (PDCCH) portion of the random access message 2.

17. The method of claim 16, wherein the PDCCH portion indicates the number of repetitions in the plurality of repetitions.

18. The method of claim 15, wherein the random access message 2 indicates to the UE to transmit the plurality of repetitions of the random access message 3 in a physical downlink shared channel (PDSCH) portion of the random access message 2.

19. The method of claim 18, wherein the PDSCH portion indicates the number of repetitions in the plurality of repetitions or resources for the plurality of repetitions.

20. The method of claim 15, wherein receiving the plurality of repetitions of the random access message 3 comprises receiving the plurality of repetitions using a frequency hopping pattern.

21. The method of claim 15, wherein the different respective refined beam for each of the plurality of repetitions is a sub-beam of a beam used for a random access message 1 and the random access message 2.

22. The method of claim 15, further comprising:
performing soft combining on the plurality of repetitions to determine a received message 3; and
determining the RSRP for each of the plurality of repetitions based on the received message 3.

23. The method of claim 15, wherein the refined second transmit beam has a narrower aperture included within a wider aperture of the first transmit beam.

24. An apparatus for wireless communication, comprising: a memory storing computer executable instructions; and at least one processor coupled to the memory and configured to execute the instructions to: transmit, to a user equipment (UE) using a first transmit beam, a random access message 2 indicating to the UE to transmit a plurality of repetitions of a random access message 3, the random access message 2 further including an indication of a number of repetitions in the plurality of repetitions; receive, associated with the transmission of the random access message 2, the plurality of repetitions of the random access message 3 using a different respective refined beam for each of the plurality of repetitions; select a refined second transmit beam associated with the respective refined beam for a one of the repetitions of the plurality of repetitions associated with a strong respective reference signal received power (RSRP), and transmit a random access message 4 via the refined second transmit beam.

25. The apparatus of claim 24, wherein the random access message 2 indicates to the UE to transmit the plurality of repetitions of the random access message in a physical downlink control channel (PDCCH) portion of the random access message 2.

26. The apparatus of claim 25, wherein the PDCCH portion indicates the number of repetitions in the plurality of repetitions.

27. The apparatus of claim 24, wherein the random access message 2 indicates to the UE to transmit the plurality of repetitions of the random access message in a physical downlink shared channel (PDSCH) portion of the random access message 2.

* * * * *